UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

SILICON-OXYGEN PRODUCT.

993,913.     Specification of Letters Patent.     Patented May 30, 1911.

No Drawing.     Application filed January 18, 1907. Serial No. 352,944.

*To all whom it may concern:*

Be it known that I, FRANK J. TONE, of Niagara Falls, Niagara county, New York, have invented a new and useful Silicon-Oxygen Product, of which the following is a full, clear, and exact description.

I have discovered that when a mixture of carbon and silica, preferably containing sufficient silica to produce silicon by reaction with the carbon, is heated in an electrical furnace, a product is produced which is condensed from the gaseous products of combustion as they issue from the furnace, and possesses a novel composition and valuable characteristics. A typical analysis of this product is as follows:

| | |
|---|---:|
| Si | 57.29 |
| O (combined with silicon) | 34.06 |
| C | 6.57 |
| $Fe_2O_3$ | .42 |
| $Al_2O_3$ | 1.26 |
| CaO | .40 |
| | 100.00 |

The product is produced most efficiently by the use of a furnace constructed to permit a free release of the gaseous and volatile products of the reaction zone along a single path. There occurs at the point of exit of the gases from the charge material of the furnace a violent blowing of gases with the production of a miniature crater at or near the surface of the charge, the walls of which are composed largely of the said product in a vitreous condition.

The gases, as they emerge from the charge, I prefer to conduct into a closed chamber, in which said product is deposited as a powder in a still greater amount by condensation against the walls of the chamber, which may be made of brick work, or other material.

In the practice of my invention, I prefer to use a furnace such as is shown and described in my Patent No. 745,122, dated November 24, 1903, but furnaces of other constructions may be used.

The charge mixture is constituted of silica and carbon, preferably in the proportions of 73 parts silica and 27 parts carbon. The proportions of carbon and silica may, however, be varied and I may use the proportions indicated by the equation $$SiO_2 + 2C = Si + 2CO,$$

or mixtures even lower in silica. It is much better, however, to employ mixtures higher in silica as they yield the desired product in greater abundance.

The product thus produced by the reduction of silica as above described, has a specific gravity of 2.22 at 24° C. It is a nonconductor of electricity. In its vitreous form, it is quite brittle, scratches glass and breaks with a vitreous fracture. Its color varies from a light brown to a dark brown, or brownish green. The product is insoluble in all single commercial acids except hydrofluoric acid, and when treated with a mixture of hydrofluoric and sulfuric acid there is a loss in weight of 64.30 per cent., the weight becoming practically constant after three treatments. This loss is a loss of silicon and oxygen, which are dissolved in approximately the proportion in which they exist in silicon dioxid. The residue is a brownish powder, which, after being freed from aluminum and iron compounds, and other impurities, represents 27.05 per cent. of the original product, and has the characteristics of amorphous silicon. It is not acted upon by any acid except to a slight degree by hydrofluoric acid, but is completely soluble in a mixture of hydrofluoric acid and nitric acid. It has a specific gravity of 2.01 and oxidizes in the air at a red heat to $SiO_2$.

The primary furnace product obtained by reduction of silica and deposited from the gases contains oxygen and silicon in approximately the proportions that are represented by the formula SiO, namely, in about the proportions of 63 parts of silicon and 37 parts of oxygen; but I have not yet been able to determine whether the product is a lower oxid of silicon, or a mixture of silica and amorphous silicon. The product is a reducing agent and can be used as such in operations where silicon and aluminum are now employed. It has other valuable applications in the art.

I claim:

1. The herein described new condensation product from the gases produced by electrically heating a mixture of carbon and silica, said product consisting substantially of silicon and oxygen, in the proportion of 63 parts silicon and 37 parts oxygen, and having a specific gravity of approximately 2.22.

2. The herein described new product condensed from the gases produced by electrically heating a mixture of carbon and silica, and consisting substantially of silicon and oxygen in the proportions of 63 parts silicon to 37 parts oxygen, in the form of a brown substance which, by treatment with hydrofluoric acid, yields a residue of amorphous silicon.

3. The within described product, being silicon monoxid SiO.

4. A physically homogeneous, light brown material composed essentially of silicon and oxygen in about the ratio of their atomic weights.

5. A material consisting of silicon and oxygen in which these elements are present in the ratio of one atom of silicon to one atom of oxygen.

6. A material containing silicon combined only with oxygen, the oxygen being less than is contained in silicon dioxid.

7. A compound of silicon and oxygen having the approximate specific gravity 2.24 and containing less weight of oxygen than of silicon.

8. A compound of silicon and oxygen only, which can be further oxidized.

9. A compound of silicon and oxygen having approximately the same specific gravity as the amorphous dioxid but containing but half as much oxygen.

10. The within described material containing silicon monoxid characterized by the extreme fineness of particle produced by sublimation into an inert environment.

11. A compound of silicon and oxygen which, when pure, has a soft brown color.

12. A pulverulent compound containing monoxid of silicon and being characterized by a soft brown color.

In testimony whereof, I have hereunto set my hand.

FRANK J. TONE.

Witnesses:
ASHMEAD G. RODGERS,
CHARLES CHORMANN.